United States Patent [19]
Clark et al.

[11] Patent Number: 5,230,810
[45] Date of Patent: Jul. 27, 1993

[54] CORROSION CONTROL FOR WET OXIDATION SYSTEMS

[75] Inventors: Mark A. Clark, Schofield; David A. Beula, Weston, both of Wis.

[73] Assignee: Zimpro Passavant Environmental Systems, Inc., Rothschild, Wis.

[21] Appl. No.: 765,220

[22] Filed: Sep. 25, 1991

[51] Int. Cl.$^5$ .............................................. C02F 1/72
[52] U.S. Cl. .................... 210/743; 210/143; 210/761; 210/96.1; 422/7; 422/12; 422/13
[58] Field of Search ............... 210/743, 761, 143, 96.1; 252/387; 422/7, 12, 13

[56] References Cited

U.S. PATENT DOCUMENTS

| | | | |
|---|---|---|---|
| 3,761,409 | 9/1973 | McCoy et al. | 210/63 |
| 4,126,550 | 11/1978 | Doerschlag | 210/743 |
| 4,174,280 | 11/1979 | Pradt et al. | 210/60 |
| 4,350,599 | 9/1982 | Chowdhury | 210/761 |
| 5,057,229 | 10/1991 | Schulenberg | 210/743 |
| 5,082,571 | 1/1992 | Beula et al. | 210/761 |

*Primary Examiner*—Stanley Silverman
*Assistant Examiner*—Neil M. McCarthy
*Attorney, Agent, or Firm*—Tipton L. Randall

[57] ABSTRACT

A process for controlling corrosion in a wet oxidation system by controlling the operating pH range within the system is described. A pH operating range is selected within which corrosion to the wet oxidation system is minimized. The pH within the wet oxidation system is monitored and a pH adjusting material is added to the waste material being treated to maintain the system pH within the selected pH operating range, thus minimizing corrosion.

7 Claims, 3 Drawing Sheets

CORROSION CONTROL FOR WET OXIDATION SYSTEMS

FIELD OF THE INVENTION

This invention relates to a method of controlling corrosion in a wet oxidation system, and more particularly to controlling the operating pH range for a wet oxidation system.

DESCRIPTION OF RELATED ART

Corrosion is a continuing problem at the elevated temperatures and pressures employed in a wet oxidation system. There is a preferred pH range for wet oxidation system operation where corrosion is minimized for the particular metal or alloy used in the construction of the system. For instance, nickel-based alloys are generally useful at pH levels greater than 7, but not in the acidic pH range. Titanium is useful over the range of pH 2 to 11, but is sensitive to fluoride. Stainless steels are useful between pH 5 and pH 10, provided chlorides concentrations are below 250 mg/1, otherwise stress corrosion cracking can result. Various methods have been described to control the pH of wastewaters during treatment to minimize corrosion to the system employed in the treatment.

In U.S. Pat. No. 3,761,409 McCoy et al. disclose a continuous process for the air oxidation of sulfidic, ammoniacal sour water where feed water is adjusted to a pH between about 6 to 13 and the oxidation occurs at 250° F. to 520° F. at 75 to 800 psig with up to 500% excess oxygen based on the stoichiometric conversion of sulfide to sulfate.

Chowdhury in U.S. Pat. No. 4,350,599 discloses wet oxidation of caustic liquor where carbon dioxide generated by the oxidation is used to reduce the pH of the caustic feed liquor to below 11. Maintaining the feed below pH 11.0 but above 7.0 prevents corrosion of the less expensive stainless steel wet oxidation system.

Problems arise where, due to formation of acidic or basic substances upon wet oxidation, the pH of the waste within a wet oxidation system changes during treatment. Additionally, the composition of the raw waste to be treated can change which may also result in variation in the pH within the wet oxidation system. To overcome this problem, we have devised a method for minimizing corrosion to a wet oxidation system which maintains the pH within the operating system to within a preselected operating range.

SUMMARY OF THE INVENTION

The invention comprises a method for operation of a wet oxidation system to control corrosion to the materials of construction of said system, the system operating at elevated temperature and pressure, the system operation comprising mixing a liquid from a liquid feed source with an oxygen-containing gas from a gas source to form an oxidation feed mixture and pumping said feed mixture through said system in the order, an influent conduit, first heat exchange means, a reactor vessel, second heat exchange means, and an effluent conduit, said control method comprising the steps;

(a) selecting a pH operating range within which corrosion to the materials of construction of the wet oxidation system is minimized;

(b) measuring pH at a point in said operating system and comparing measured pH with selected pH operating range by comparing means; and (c) adding pH adjusting material to said liquid feed source in response to said measured pH deviating outside of said selected pH operating range, thereby correcting the pH throughout the system to within said pH operating range.

The pH of the operating system is measured either at the effluent or after the first heat exchange means. The pH adjusting material may be either an acidic or basic material.

DESCRIPTION OF THE PREFERRED EMBODIMENTS

Figure 1:
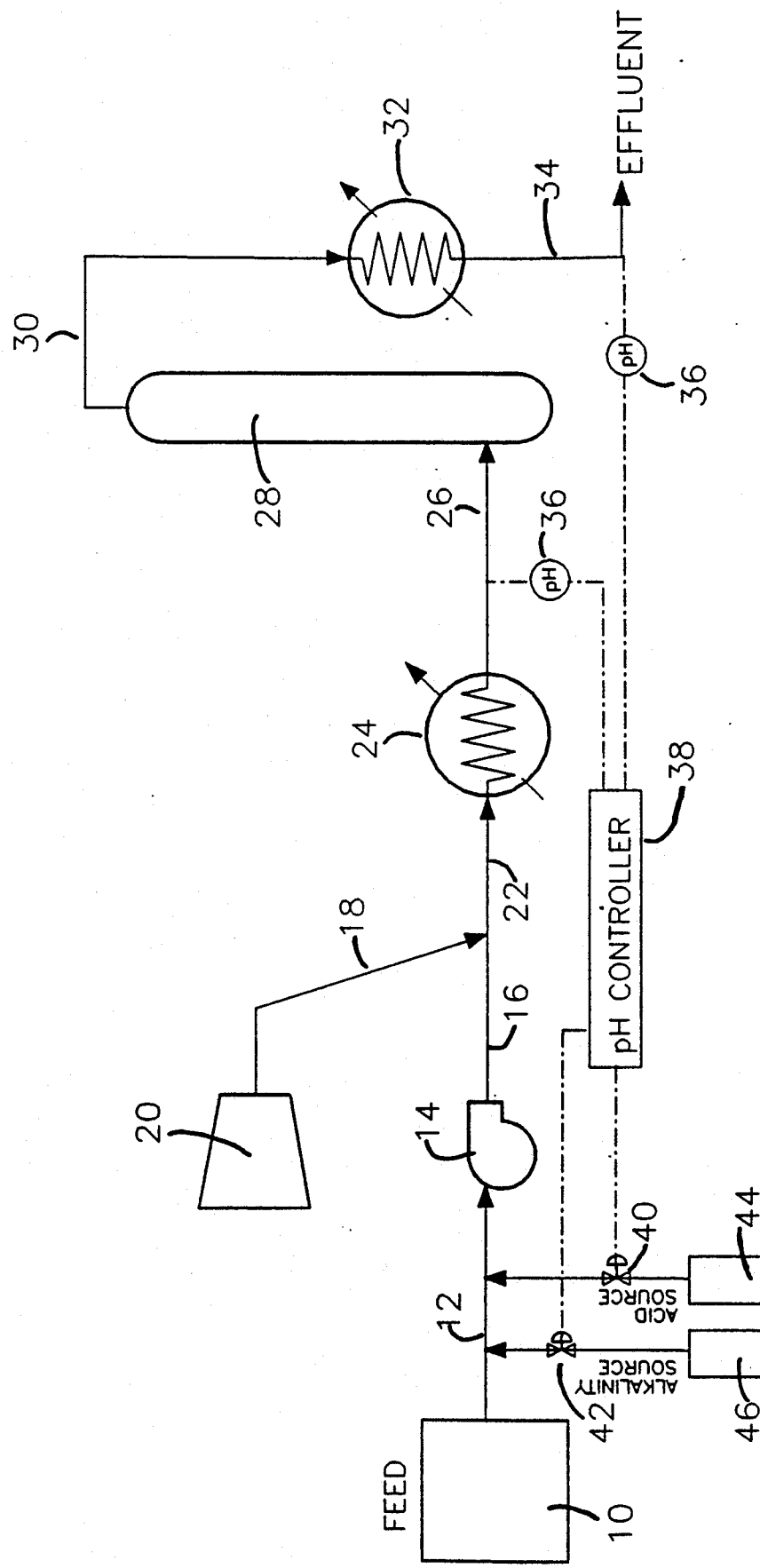
FIG. 1 is a general schematic for a wet oxidation system which employs the control method of the invention.

Referring to FIG. 1, a liquid waste feed material is contained within a tank 10. The liquid waste feed flows from the tank 10, through a supply conduit 12 to a pump 14 where the liquid is pressurized to system pressure. The liquid flows through another conduit 16 where it is mixed with a pressurized oxygen-containing gas, such as air or oxygen, supplied from a conduit 18 and, in this case, a compressor 20. The gas and liquid mix to form an oxidation feed mixture which flows through an influent conduit 22 and thence to a first heat exchange means 24. The oxidation feed mixture is heated to an elevated temperature by the heat exchanger 24 and then traverses a conduit 26 and enters a reactor vessel 28 which provides residence time for the wet oxidation reaction to occur. The oxidized gas-liquid mixture exits the reactor vessel 28 via a conduit 30 and thence through a second heat exchange means 32 where the hot mixture is cooled. The cooled oxidized mixture then leaves the wet oxidation system by an effluent conduit 34. At some point beyond the conduit 34, the liquid and gases are depressurized, separated and discharged separately.

During the treatment of some wastes by wet oxidation, the pH of the waste can change significantly compared to the feed material. This change within the system can cause severe corrosion damage to the materials of construction of the wet oxidation system. The composition of the raw waste may also change and this results in a dynamic situation where pH can change widely within the wet oxidation system.

Wet oxidation can oxidize materials which consume alkalinity upon oxidation or which can produce acid species on wet oxidation treatment. Thus, system pH can become quite acidic when this occurs. Likewise, wet oxidation may generate or liberate basic species, such as ammonia, amines or carbon dioxide, which can raise the pH of a waste within the system to the alkaline side. Either type of change in pH can cause severe corrosion to the wet oxidation system. It is not always easy to predict which direction and to what extent pH will change upon wet oxidation. To overcome this problem, we have devised a method of operation for a wet oxidation system which prevents excessive corrosion to the materials of construction.

The method comprises selecting a pH operating range within which corrosion to the wet oxidation system is minimized, and then measuring the pH within the system and comparing the measured pH with the selected pH operating range by a comparing means such as a pH controller or the like. Where the pH of the system deviates outside of the selected operating range, an appropriate pH adjusting material is added to the liquid feed to correct the system pH to within the selected operating range.

Referring again to FIG. 1, a pH probe 36 or 36' is positioned to monitor pH within the system. The actual pH measurement may require cooling and depressurizing a small side stream of oxidation mixture from the system prior to making the pH measurement. The measured pH at the cooler temperature may be slightly different from the pH within the system, but the difference can be taken into account when setting the selected pH operating range. The pH probe is connected to a pH controller 38 which in turn controls the valves 40 and 42. These valves, 40 and 42, control addition of acid or base to the raw waste feed from an acid source 44 and a base source 46, respectively. Should the pH of the waste within the system rise above the selected pH operating range, the controller opens the valve 40 to allow a selected flow of acid to enter the feed which reduces the pH in the system to within the selected range. Likewise, a drop in pH within the system results in the controller 38 opening the valve 42 to allow a selected flow of alkalinity to enter the feed material and raise the system pH to within the selected operating range. The pH adjusting material is most easily added to the feed ahead of the pump 14. An inline mixer between the point of addition and the pump is useful for thoroughly mixing the feed and pH adjusting material.

The controller is designed so as not to add excessive pH adjusting material to the feed and overcompensate for a system pH deviation. A certain time lag will occur between the system pH deviating outside the selected operating range and the pH correction reaching the point of measurement in the system. This factor must also be included in the design of the controller 38.

The location of the system pH probe will depend on the characteristics of the particular waste being treated. For wastes which undergo wet oxidation quite readily, such as caustic sulfide wastes, the pH probe is located after the first heat exchange means 24 and before the reactor 28 since a significant portion of the oxidation occurs within the first heat exchanger and the pH changes markedly at that point in the system. This location provides for a quick response to pH changes across the first heat exchange means. Alternatively, the pH probe may be located in the effluent line 34 when the pH change within the system is slower and occurs mainly in the reactor vessel. This situation occurs with less easily oxidized wastewaters, or where a concentrated wastewater is added directly to the reactor vessel without traversing the influent heat exchanger 24. The residence time for the waste within the second heat exchange means is generally only a few minutes so no advantage is gained by locating the pH measurement after the reactor vessel but ahead of the second heat exchange means 32.

Figure 2:
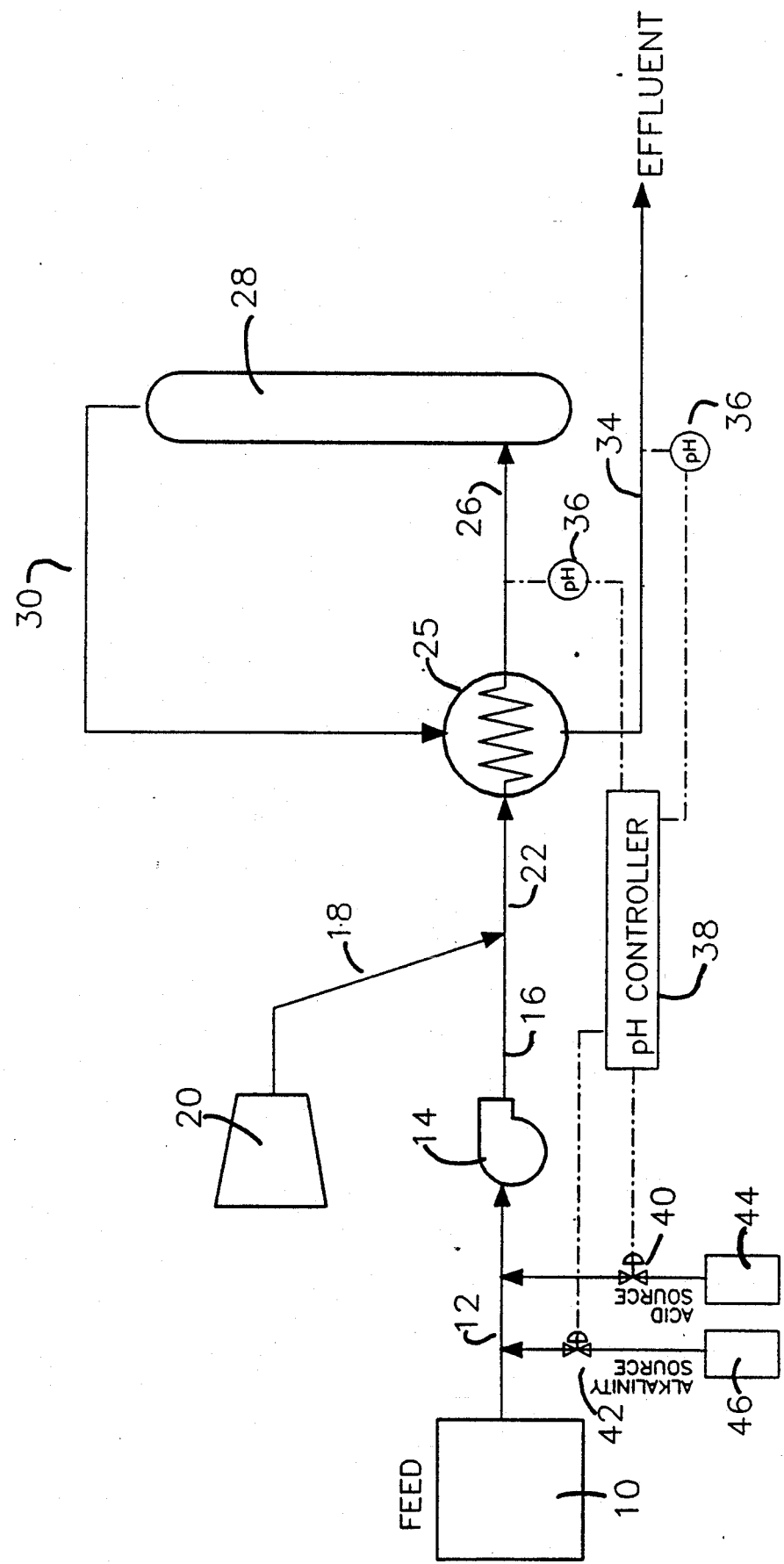
FIG. 2 is an alternative schematic for a wet oxidation system which also employs the control method of the invention.

FIG. 2 shows an alternative flow scheme where the first and second heat exchange means are combined as a process heat exchanger 25 where the hot oxidation mixture is cooled against the incoming cold raw waste and oxygen-containing gas. The components common to FIGS. 1 and 2 are denoted by the same indica.

Figure 3:
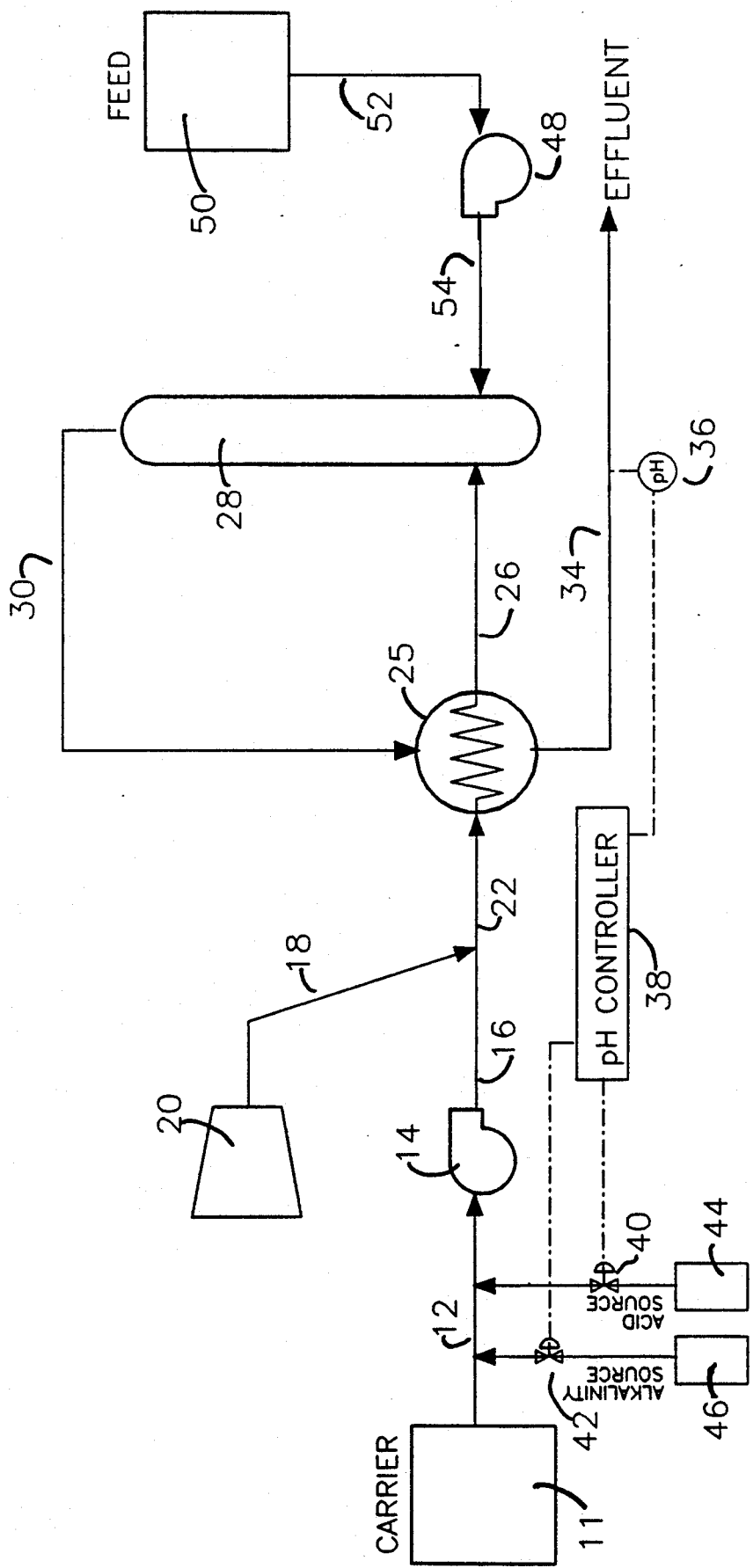
FIG. 3 is another alternative schematic for a wet oxidation system which employs the control method of the invention.

FIG. 3 shows another flow scheme which is employed for injecting waste liquid directly into the wet oxidation reactor vessel. Components common to FIGS. 1, 2 and 3 are again denoted by the same indica. In FIG. 3 a carrier liquid, such as dilution water, is contained within a tank 11. The carrier liquid feed flows from the tank 11, through a supply conduit 12 to a pump 14 where the liquid is pressurized to system pressure. The carrier liquid flows through another conduit 16 where it is mixed with a pressurized oxygen-containing gas, such as air or oxygen, supplied from a conduit 18 and, in this case, a compressor 20. The gas and liquid mix to form an carrier liquid/gas mixture which flows through an influent conduit 22 and thence to a process heat exchange means 25. The carrier liquid/gas mixture is heated to an elevated temperature by the heat exchanger 25 and then traverses a conduit 26 and enters a reactor vessel 28. A second pump 48 is supplied with liquid waste from a storage tank 50 via a conduit 52. The pump 48 delivers feed liquid waste directly to the wet oxidation reactor vessel 28 via a conduit 54 where the waste mixes with the heated carrier liquid/gas mixture and undergoes wet oxidation treatment. The oxidized liquid/gas mixture exits the reactor vessel 28 via a conduit 30 and is cooled against incoming carrier liquid/gas mixture in the process heat exchanger 25. This flow scheme is employed with liquid wastes which are difficult to mix with water, contain particles which may settle out of suspension, or wastes which are sensitive to heat, such as explosives.

In FIG. 3 the pH of the system is monitored at a point downstream from the reactor vessel 28, in this case, at point 36'. The controller 38 responds to the oxidized effluent pH deviating outside of the selected pH operating range by adding acid or base to the carrier liquid feed as was outlined for FIG. 1 above. The heat exchanger means alternatively may be configured separately as was shown in FIG. 1 above.

From the foregoing description, one skilled in the art can easily ascertain the essential characteristics of the invention and, without departing from the spirit and scope thereof, make various changes and modifications to adapt it to various usages.

We claim:

1. A control method for operation of a wet oxidation system to control corrosion to materials of construction of said system, the system operating at elevated temperature and pressure, the system operation comprising mixing a liquid from a liquid feed source with an oxygen-containing gas from a gas source to form an oxidation feed mixture and pumping said feed mixture through said system in the order, an influent conduit, first heat exchange means, a reactor vessel, second heat exchange means, and an effluent conduit, said control method comprising the steps;
   (a) selecting a pH operating range within which corrosion to the materials of construction of the wet oxidation system is minimized;
   (b) measuring pH at a point in said operating system and comparing measured pH with said selected pH operating range by comparing means; and
   (c) adding pH adjusting material to said liquid feed source in an amount to bring the pH throughout the system to within said pH operating range.

2. A process according to claim 1 wherein said point of pH measuring in said operating system is at said effluent conduit, beyond said second heat exchange means.

3. A process according to claim 1 wherein said point of pH measuring in said operating system is after said first heat exchange means, ahead of said reactor vessel.

4. A process according to claim 1 wherein said pH adjusting material is an alkalinity source.

5. A process according to claim 1 wherein said pH material is an acidity source.

6. A control method for operation of a wet oxidation system to control corrosion to materials of construction of said system, the system operating at elevated temperature and pressure, the system operation comprising mixing a carrier liquid from a carrier liquid source with an oxygen-containing gas from a gas source to form a carrier liquid/gas mixture and pumping said liquid/gas mixture through said system in the order, an influent conduit, first heat exchange means, a reactor vessel, second heat exchange means, and an effluent conduit, and injecting a liquid feed material directly into said reactor vessel, said control method comprising the steps;

(a) selecting a pH operating range within which corrosion to the materials of construction of the wet oxidation system is minimized;

(b) measuring pH at a point in said operating system downstream of said reactor vessel, and comparing measured pH with said selected pH operating range by comparing means; and (c) adding pH adjusting to said carrier liquid source in an amount to bring the pH throughout the system to within said pH operating range.

7. A process according to claim 6 wherein said point of pH measuring in said operating system is at said effluent conduit, beyond said second heat exchange means.

* * * * *